(12) United States Patent
Vissenberg et al.

(10) Patent No.: US 10,571,082 B2
(45) Date of Patent: Feb. 25, 2020

(54) LIGHTING DEVICE FOR A LIGHT SOURCE

(71) Applicant: SIGNIFY HOLDING B.V., Eindhoven (NL)

(72) Inventors: Michel Cornelis Josephus Marie Vissenberg, Eindhoven (NL); Oliver Dross, Eindhoven (NL); Johannes Petrus Maria Ansems, Eindhoven (NL); Dirk Jan Van Kaathoven, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/339,539

(22) PCT Filed: Oct. 9, 2017

(86) PCT No.: PCT/EP2017/075654
§ 371 (c)(1),
(2) Date: Apr. 4, 2019

(87) PCT Pub. No.: WO2018/069236
PCT Pub. Date: Apr. 19, 2018

(65) Prior Publication Data
US 2019/0242536 A1    Aug. 8, 2019

(30) Foreign Application Priority Data
Oct. 11, 2016    (EP) .................................. 16193333

(51) Int. Cl.
*F21K 9/62*    (2016.01)
*F21V 3/04*    (2018.01)
(Continued)

(52) U.S. Cl.
CPC .................. *F21K 9/62* (2016.08); *F21K 9/66* (2016.08); *F21V 3/04* (2013.01); *F21V 3/049* (2013.01);
(Continued)

(58) Field of Classification Search
CPC ............ F21K 9/62; F21K 9/66; G02B 6/0045
See application file for complete search history.

(56) References Cited

U.S. PATENT DOCUMENTS 8,628,220 B2    1/2014 Boonekamp et al.
8,827,523 B1    9/2014 Sun et al.
(Continued)

FOREIGN PATENT DOCUMENTS

CN    204647935 U    9/2015
EP    1857729 A1    11/2007
(Continued)

*Primary Examiner* — Donald L Raleigh
(74) *Attorney, Agent, or Firm* — Daniel J. Piotrowski

(57) ABSTRACT

The present disclosure relates to a color tunable lighting device comprising at least one light source (302), a symmetry axis (306) and an envelope (304). The at least one light source (302) is disposed on a base (301) extending within a plane and the envelope (304) is disposed at least above the base (301) and defines a cavity (305) extending along the symmetry axis (306). The at least one light source (302) is arranged at a distance X from the symmetry axis (306) along a radial direction relative to the symmetry axis. The plane is arranged to intersect the symmetry axis (306). The distance X may be at least 50% of a total distance between the symmetry axis (306) and an edge of the envelope (304), or a projection of the edge of the envelope (304) on the plane in which the base (301) extends, as seen along the radial direction. A curvature of the envelope (304) is monotonically increasing with an increasing distance from the base (301).

14 Claims, 11 Drawing Sheets

(51) Int. Cl.
*F21V 8/00* (2006.01)
*F21K 9/66* (2016.01)
*F21Y 113/13* (2016.01)
*F21Y 115/10* (2016.01)

(52) U.S. Cl.
CPC ......... *G02B 6/0045* (2013.01); *G02B 6/0068* (2013.01); *G02B 6/0073* (2013.01); *F21Y 2113/13* (2016.08); *F21Y 2115/10* (2016.08)

(56) References Cited

U.S. PATENT DOCUMENTS

| | | |
|---|---|---|
| 8,953,926 B1 | 2/2015 | Kelly et al. |
| 9,103,507 B2 | 8/2015 | Allen et al. |
| 2006/0226795 A1 | 10/2006 | Walter et al. |
| 2008/0123349 A1 | 5/2008 | Chaves et al. |
| 2011/0080740 A1 | 4/2011 | Allen et al. |
| 2013/0039058 A1 | 2/2013 | Yun et al. |
| 2014/0160762 A1 | 6/2014 | Dudik et al. |
| 2015/0036333 A1 | 2/2015 | Tsuei et al. |
| 2018/0073690 A1* | 3/2018 | Magno ................ F21K 9/66 |

FOREIGN PATENT DOCUMENTS

| | | |
|---|---|---|
| JP | 2003016808 A | 1/2003 |
| JP | 2007194132 A | 8/2007 |
| WO | 2016001271 A1 | 1/2016 |

* cited by examiner

Farfield: Color intensity plot

Nearfield: Color illuminance plot

*Farfield: Color intensity plot*

*Nearfield: Color illuminance plot*

Farfield: Color intensity plot

Nearfield: Color illuminance plot

Farfield: Color intensity plot

Nearfield: Color illuminance plot

Farfield: Color intensity plot

Nearfield: Color illuminance plot

LIGHTING DEVICE FOR A LIGHT SOURCE

CROSS-REFERENCE TO PRIOR APPLICATIONS

This application is the U.S. National Phase application under 35 U.S.C. § 371 of International Application No. PCT/EP2017/075654, filed on Oct. 9, 2017, which claims the benefit of European Patent Application No. 16193333.8, filed on Oct. 11, 2016. These applications are hereby incorporated by reference herein.

TECHNICAL FIELD

The present disclosure generally relates to the field of lighting devices, and in particular to a lighting device comprising at least one light source.

BACKGROUND

There is a growing interest in making light sources colour-tunable. Normally, it is proposed to combine LEDs with different colour spectra in one lighting product.

Some lighting products generate different spectra at different positions, and sometimes also in different directions. Depending on the optical architecture, this may result in visible colour differences in the light distribution in space (in the far field distribution), in visible colour differences in the emitting area in the luminance distribution (which is also called the near-field distribution) and in coloured shadows.

Other disadvantages relate to sizes of optical elements used in such lighting products. Current colour-mixing optical elements are either very large to achieve good mixing, or constrained in size (to reduce cost, or to keep a sufficiently high brightness) with a compromise between near-field colour mixing quality and far-field colour mixing quality. Moreover, for small mixing chambers, substantial efficiency losses may occur.

The known solutions so far regarding light sources having different spectral emission are to position the light sources very close together to minimize the size of the colour-mixing optical element. However, this is also disadvantageous for thermal management reasons.

Thus, there is a need for a colour-tunable, less complex, low-cost lighting device that has an improved colour mixing quality.

U.S. Pat. No. 8,953,926 discloses a light emitting device based on a light guide structure. The light emitted from the light sources (LEDs) is injected into the light guide and transported via internal reflection to the places where it is emitted to the ambient.

US 2015/036333 discloses a light emitting device in which at least part of the light is injected in a light guide that is also arranged as envelope for emitting the light to the ambient; the remaining part is transmitted into the interior volume.

US 2013/039058 shows a lighting device in which the light is injected into a light guide and distributed in this light guide by internal reflections and then emitted to the ambient.

SUMMARY

It would be advantageous to achieve a lighting device addressing one or more of the above mentioned issues. In particular, it would be desirable to obtain improved performance or operation of a lighting device in terms of colour tunability.

To better address one or more of these issues, a lighting device having the features defined in the independent claim is provided. Preferable embodiments are defined in the dependent claims.

Hence, according to an aspect of the present disclosure a lighting device is provided. The lighting device comprises at least one light source disposed on a base extending within a plane and further comprises an envelope disposed at least above the base and defining a cavity extending along a symmetry axis. The plane is arranged to intersect the symmetry axis. The at least one light source is arranged at a distance X from the symmetry axis along a radial direction relative to the symmetry axis, where the distance X is at least 50% of a total distance between the symmetry axis and an edge of the envelope, or between the symmetry axis and a projection of the edge of the envelope on the plane in which the base extends, as seen along the radial direction. The curvature of the envelope is monotonically increasing with an increasing distance from the base.

It will be appreciated that, if the edge is not in the same plane as the base, the distance may be defined as the projection of the edge of the envelope on the plane in which the base extends. The term edge may in this case be the point at which the envelope has its end.

In some embodiments, the envelope may be disposed (directly, i.e. in physical contact) on the base. It will also be appreciated that in some other embodiments, the envelope may extend beyond the base along the symmetry axis, for example for mechanical reasons (although this may not provide any further optical function). The edge may therefore be defined as the intersection between the envelope and the base but also, as mentioned above, as where the envelope ends if it does not touch or intersect the base.

In an embodiment, a portion of the envelope, close to the base, may have a radius relative to the symmetry axis that increases with an increasing distance from the base.

With a lighting device according to the above defined aspect, artefacts may be greatly reduced and colour-mixing both in transmission mode and reflection mode may be improved. In the lighting device according to this aspect, the shape of the surface of the envelope defining the cavity is determined on a condition that the at least one light source produces a symmetric illuminance pattern on the envelope surface even though the at least one light source is placed off axis (off-centric) with respect to the symmetry axis. In this case, the difference in distance between the at least one light source and the envelope surface or edge is compensated by the different angle that the envelope surface has with the light coming from the at least one light source.

In the lighting device according to this aspect, the light source is placed off-axis, i.e. not aligned along the symmetry axis (or the optical axis) of the lighting device and the envelope has a shape such that a first portion, located close to the base (or in proximity of the base or closest to the base) has a radius relative to the symmetry axis that increases with an increasing distance from the base. In a second portion, located above the first portion relative to the base, the radius of the envelope is decreasing with an increasing distance from the base.

In an embodiment, the distance X may be at least 80% of the total distance between the symmetry axis and the edge of the envelope or between the symmetry axis and a projection of the edge of the envelope on the plane in which the base extends, as seen along the radial direction.

In an embodiment, the distance X may be the distance between the symmetry axis and the surface of the envelope.

According to an embodiment, the surface of the envelope may have diffusive properties.

According to an embodiment, the surface of the envelope may comprise a light scattering texture and/or wherein a material of the envelope may comprise scattering particles.

According to an embodiment, the envelope may be rotationally symmetric with respect to the symmetry axis.

According to an embodiment, a tangent at the surface of the envelope may be a slope defined such that illuminance of the at least one light source is constant or approximately constant along a circle on the surface, in a plane perpendicular to the symmetry axis.

According to some embodiments, the at least one light source may include at least two light sources, wherein each light source is arranged on the base at an equal distance to the symmetry axis.

According to another embodiment, the at least one light source may include at least two light sources configured to generate light according to different color spectra.

According to an embodiment, the at least two light sources may have similar intensity distributions. In some embodiments, the intensity distribution may be equivalent.

According to another embodiment, the surface of the envelope may comprise a transmitting surface.

According to another embodiment, the envelope may further comprise a reflective surface portion.

More generally, the envelope surface may be either fully transmitting or fully reflective, but it may also be partly transmitting and partly reflective.

According to some embodiments, the at least one light source may be a light-emitting diode (LED). For example, the lighting device may include one LED emitting red light and another LED emitting cyan light.

According to a particular embodiment, the at least one light source may be a Lambertian light source. However, in some other embodiments, the at least one light source may be non-Lambertian sources as long as the light sources produce essentially the same intensity distribution.

According to some embodiments, the base at which the at least one light source is arranged may be configured to output light from the cavity.

According to some embodiments, the cavity may be arranged to mix light emitted from the at least one light source.

Further objects, features and advantages of the present invention will become apparent from the following detailed description, the drawings and the appended claims. Those skilled in the art will realize that different features of the present invention may be combined to create embodiments other than those described in the following.

BRIEF DESCRIPTION OF THE DRAWINGS

These and other aspects will now be described in more detail with reference to the appended drawings showing embodiments of the present invention. In the figures showing colour intensity plots or colour illuminance plots, the differences in colour are made visible as lightness variations in the grayscale images where the cyan is translated to a lighter grey scale than the red.

FIG. 1b shows a greyscale representation of a colour intensity plot of the far-field distribution provided by the two colored light sources shown in FIG. 1a.

FIG. 2b shows a greyscale representation of a colour intensity plot of the far-field distribution provided by the lighting device shown in FIG. 2a.

FIG. 2c shows a greyscale representation of a colour illuminance plot of the near-field distribution provided by the lighting device shown in FIG. 2a.

FIG. 4b shows a greyscale representation of a colour intensity plot of the far-field distribution provided by the lighting device shown in FIG. 4a.

FIG. 4c shows a greyscale representation of a colour illuminance plot of the near-field distribution provided by the lighting device shown in FIG. 4a.

FIG. 5b shows a greyscale representation of a colour intensity plot of the far-field distribution provided by the lighting device shown in FIG. 5a.

FIG. 5c shows a greyscale representation of a colour illuminance plot of the near-field distribution provided by the lighting device shown in FIG. 5a.

FIG. 6b shows a greyscale representation of a colour intensity plot of the far-field distribution provided by the lighting device shown in FIG. 6a.

All the figures are schematic, not necessarily to scale, and generally only show parts which are necessary in order to elucidate the embodiments, wherein other parts may be omitted or merely suggested. Like reference numerals refer to like elements throughout the description.

DETAILED DESCRIPTION OF EMBODIMENTS

The present aspect and embodiments will now be described more fully hereinafter with reference to the accompanying drawings. The invention may, however, be embodied in many different forms and should not be construed as limited to the embodiments set forth herein; rather, these embodiments are provided for thoroughness and completeness, and fully convey the scope of the present aspects to the skilled person.

Figure 1A:
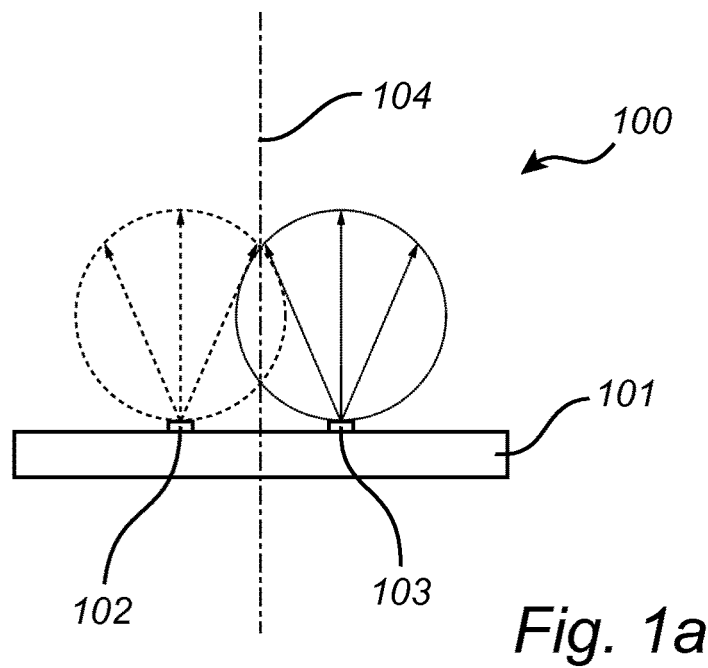
FIG. 1a shows a side view of two coloured light sources.

FIG. 1a shows a basic lighting device 100 with two light sources emitting light of different colour spectra. The lighting device comprises a base 101. In the present example, one Lambertian emitting red source 102 and one Lambertian emitting cyan source 103 are arranged at diametrically opposite positions on the base 101. Alternatively, in other embodiments, these sources may be arranged at any position on a circle around a symmetry axis. The base 101 may for example be an absorbing substrate with a symmetry axis 104. The symmetry axis 104 is normally an optical axis of the lighting device 100.

Figure 1B:
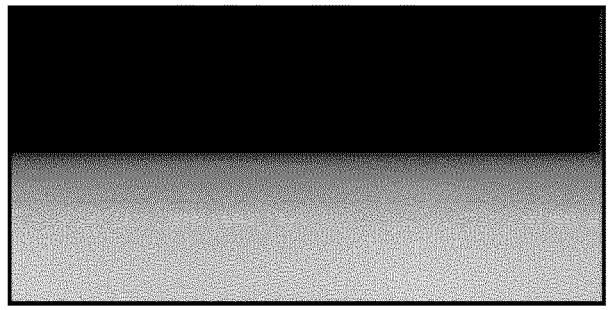
Figure 1C:
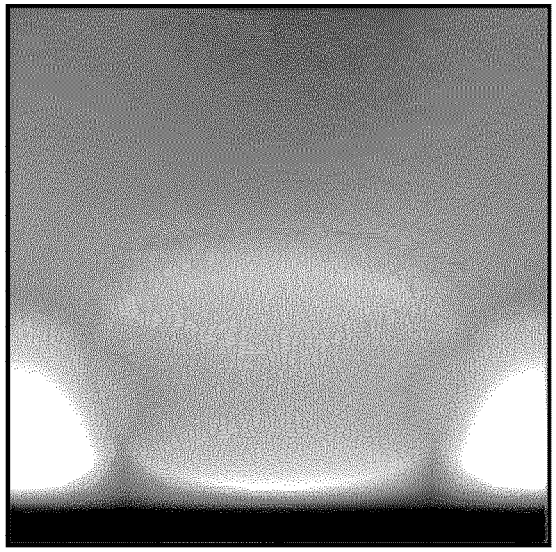
FIG. 1c shows a greyscale representation of a colour illuminance plot of the near-field distribution provided by the two colored light sources shown in FIG. 1a. The near-field distribution is determined on a cylinder with an arbitrarily chosen diameter of about four times the light source spacing.

When two Lambertian sources emit light of different colours in the same direction, these colours may automatically be perfectly mixed in the far-field distance. This far-field distance may in some instances be larger than about 5-10 times and at least 5 times the spacing between the two light sources. This perfectly mixed far-field distribution may be seen in FIG. 1b. The colours are however not well mixed in the near-field at distances comparable to the source spacing, as may be seen in FIG. 1c. The near-field distance may in this embodiment be about two times the source spacing but may also correspond to a shorter distance of for example less than 2 times or even only 0.5 times the source spacing, i.e. right next to one of the sources.

The lighting device 100 may include an envelope (not shown in FIG. 1a), placed on top of the light sources 102 and 103 to form a cavity of the lighting device. The cavity's function may be to hide the light sources 102 and 103 from direct view, change the emission pattern into a more omnidirectional emission, or mix the near-field colours and reduce coloured shadows.

Figure 2A:
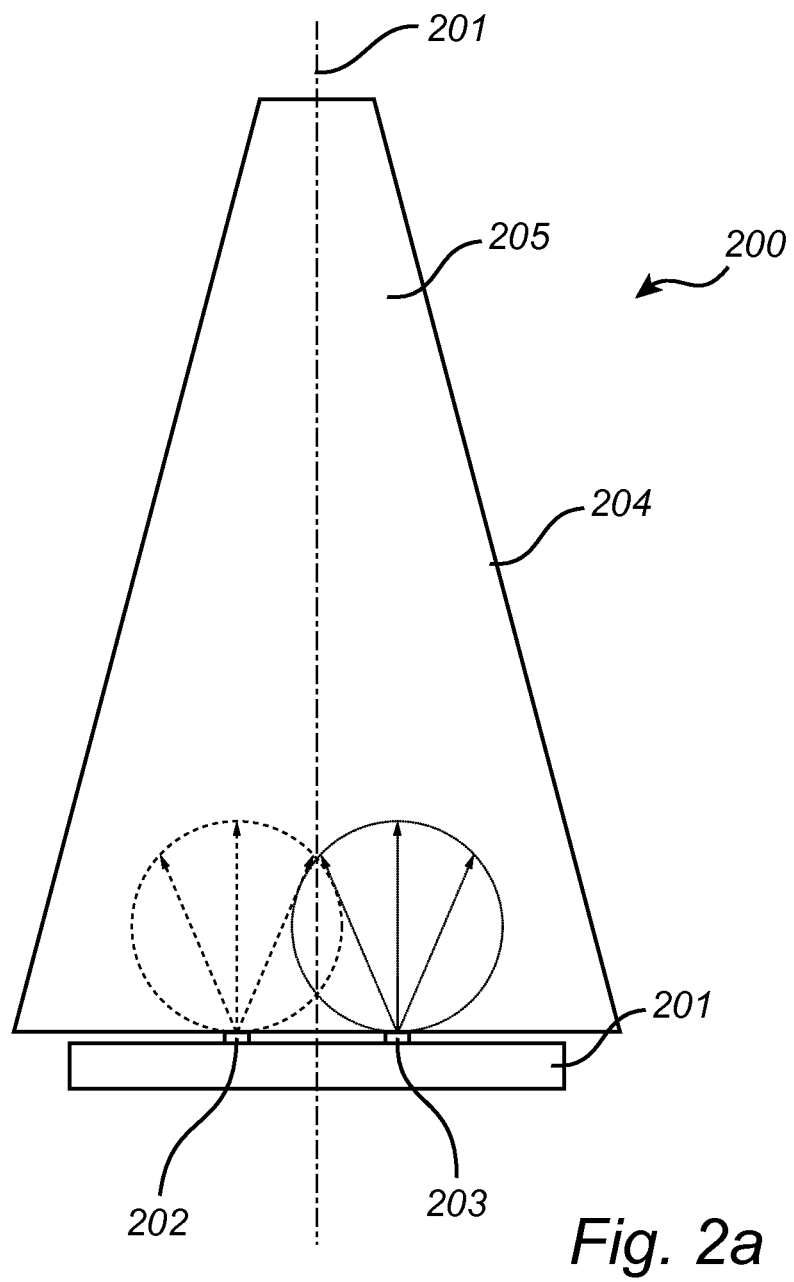
FIG. 2a shows a side view of a lighting device comprising a conical cavity and two coloured light sources.
Figure 2B:
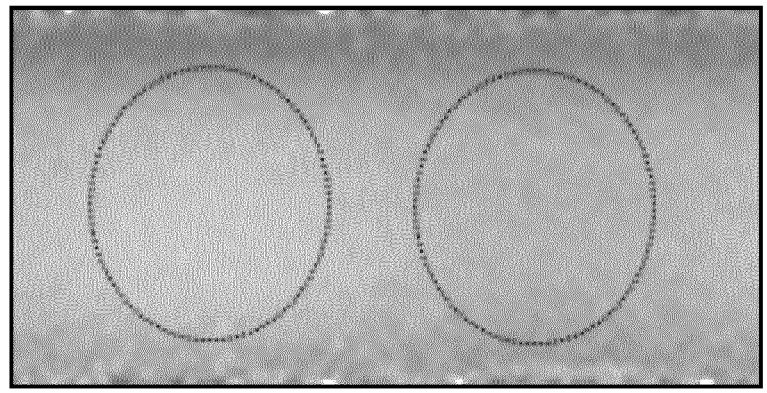
Figure 2C:
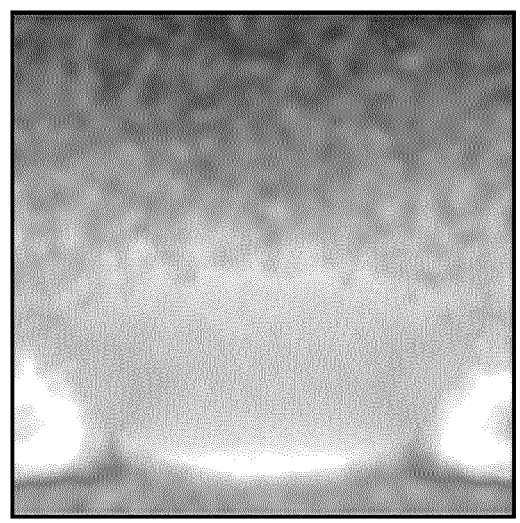

FIG. 2a shows an example of a lighting device 200 with a cavity 205 defined by an envelope 204 having the form of a conical diffuser and extending along a symmetry axis 201. The size of this cavity 205 may be limited to a few times the separation distance between the light sources 202 and 203. In this case, wherein an arbitrary shape is used for the envelope 204, a far-field asymmetry of the left-right colours may be introduced by the diffuser as indicated by dashed ellipses in the colour intensity plot of FIG. 2b. The near-field colour mixing shown in FIG. 2c may be improved but still not acceptable.

Figure 3A:
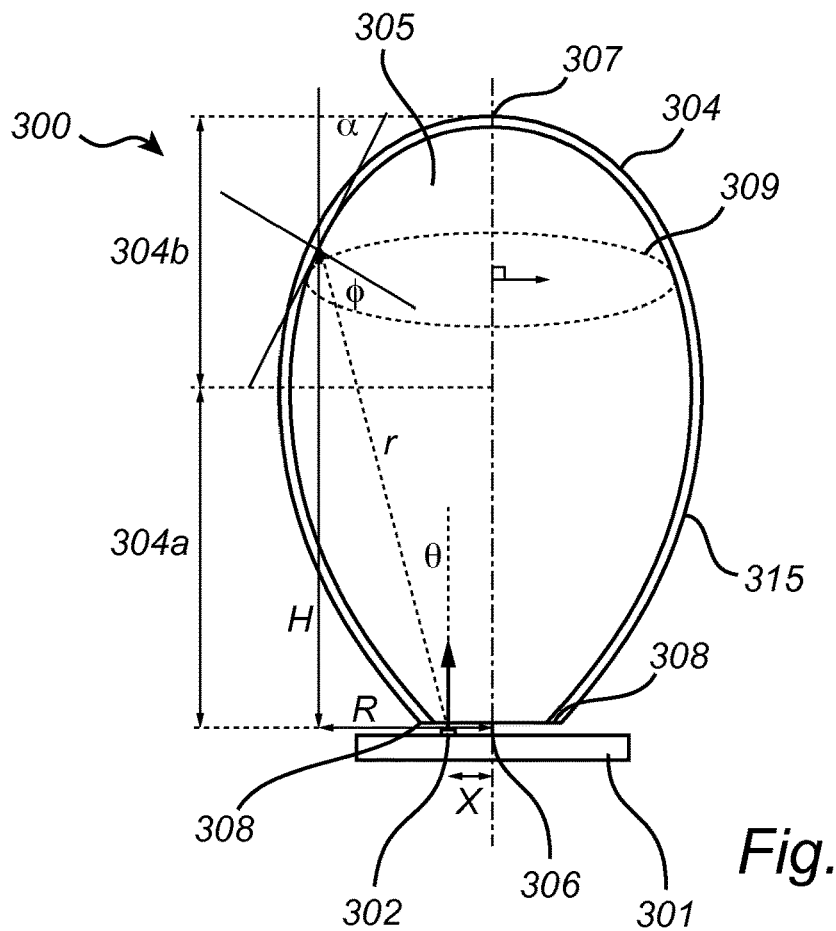
FIG. 3a shows a side view of a lighting device including a cavity according to an embodiment.

With reference to FIG. 3a, an embodiment of the present disclosure is described. FIG. 3a shows a lighting device 300 including an optical cavity 305 having an envelope 304. In the embodiment shown in FIG. 3a, the lighting device 300 includes only one light source 302. The light source is disposed on a base 301 extending within a plane. The envelope 304 is disposed on the base 301 and defines a cavity extending along a symmetry axis 306, which may be an optical axis of the lighting device 300. The plane 301 intersects the symmetry axis 306. In particular, in an embodiment the plane may be perpendicular to the symmetry axis. The light source 302 may be arranged a distance X from the symmetry axis 306, along a radial direction relative to the symmetry axis 306. The distance X may be at least 50% of a total distance between the symmetry axis 306 and an edge 308 of the envelope 304, when seen along the radial direction. Alternatively, this distance X may be at least 50% of a total distance between the symmetry axis 306 and a projection of the edge 308 of the envelope on the plane in which the base extends, when seen along a radial direction. This can for example be the case for a lighting device including partial envelopes, where the envelope 304 starts at a height above the base 301, i.e. when the envelope is not in contact (or does not intersect) the plane in which the base extends.

The distance X may in many cases be at least 80% of the total distance between the symmetry axis 306 and the edge 308 of the envelope 304 in order to optimize color mixing or between the symmetry axis 306 and a projection of the edge 308 of the envelope 304 on the plane in which the base extends, as seen along the radial direction.

The envelope 304 extends along the symmetry axis 306. A first portion 304a of the envelope 304 located closest to the base 301 may have a radius relative to the symmetry axis 306 that increases with an increasing distance from the base 301. In other words, the radius of the envelope 304 increases from the base 301 in the direction of the top part (or the apex 307) of the envelope 304 in a first portion 304a of the envelope 304. Then, in a second portion 304b, i.e. at a certain distance from the base 301, a radius of the envelope may be decreasing. In the two portions, the curvature of the envelope may be monotonically increasing with an increasing distance from the base 301 until the curvature is the highest at the apex of the envelope 304.

The surface of the envelope 304 may have diffusive properties. For example, the surface of the envelope 304 may comprise a light scattering texture and/or a material of the envelope may comprise scattering particles. The material may for example constitute the bulk of the envelope.

The envelope 304 may be rotationally symmetric with respect to the symmetry axis. This means that around the symmetry axis, the shape of the envelope is symmetric. However, the envelope may also be linear, like an extrusion profile, with a cross-section as shown in FIG. 3a. The sources may then be placed on two lines at the same distance of the symmetry axis. A tangent at the surface of the envelope may have a slope defined such that the illuminance of the light source 302 is constant along a circle 309 on the envelope surface, the circle 309 being in a plane perpendicular to the symmetry axis 306 (as illustrated by the right angle with the radial direction r in FIG. 3a). In this embodiment, the envelope surface may be a transmitting surface.

The difference in distance between the light source 302 and the surface of the envelope 304 for different locations may be compensated by the angle α, which is the angle between the tangent of the envelope surface and the symmetry axis 306. In other words, the curvature of the envelope 304 is designed to compensate for the difference in illuminance from the light source 302 at different locations at the envelope 304.

In one example embodiment, the shape of the envelope 304 may resemble an ellipsoid, but it may have other different shapes.

Figure 3B:
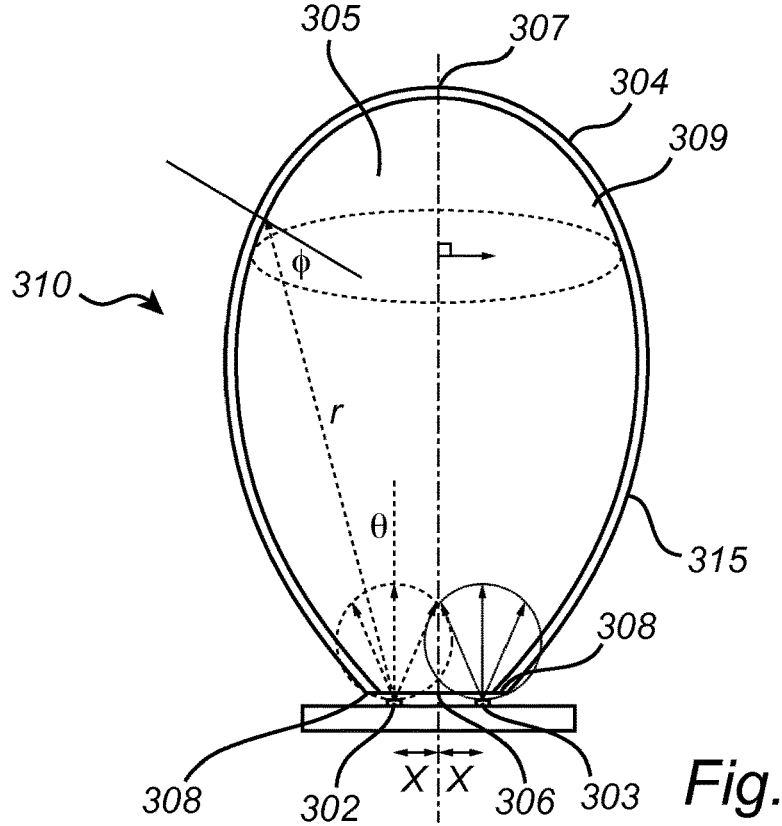
FIG. 3b shows a side view of a lighting device including a cavity with two light sources according to an embodiment.

With reference to FIG. 3b, a lighting device 310 according to another embodiment is described. FIG. 3b shows a lighting device 310 which is equivalent to the lighting device 300 described with reference to FIG. 3a, except that the lighting 310 includes two light sources 302 and 303. As for the lighting device 300, it comprises a symmetry axis 306, an envelope 304 disposed on a base 301 for defining a cavity 305. Each light source 302, 303 is arranged on the base at an equal distance to the symmetry axis 306.

The illuminance E of a light source in a direction defined by two angles θ and φ at a distance r from the light source, i.e. at a point of interest on the surface of the envelope 304, may be expressed as $E=I(\theta)*\cos(\varphi)/r^2$ (equation 1) where θ is the angle between said direction and the symmetry axis 306 and where φ is the angle between said direction and a normal to the envelope surface.

For a Lambertian light source 302 at the distance X from the symmetry axis 306, the illuminance E at a point located on the envelope surface at a distance H from the light source 302 along the symmetry axis 306 and a distance R from the symmetry axis 306 along a radial direction relative to the symmetry axis 306 is then given by:

$$E(x) = I_0 * (\cos\theta)^3 * \frac{\cos\varphi}{H^2} \quad \text{(equation 2)}$$
$$= (I_0/H^2) * (\cos\theta)^3 * (\sin\alpha \cos\theta + \sin\theta\cos\alpha)$$
$$= I_0 * \frac{H}{(H^2 + (R-x)^2)^2} * (\sin\alpha\, H + (R-x)\cos\alpha)$$

With the constraint that the illuminance is the same for two light sources E(x)=E(−x), the curvature of the envelope 304 may then be determined by:

$$\tan\alpha = -\frac{R}{H} + \frac{x}{H} * \frac{H^2 + (R+x)^2)^2 + (H^2 + (R-x)^2)^2}{(H^2 + (R+x)^2)^2 - (H^2 + (R-x)^2)^2} \quad \text{(equation 3)}$$

The surface of the envelope 304 may have a shape determined by the integration of:

$$\frac{dH}{dR} = -\frac{1}{\tan\alpha} \quad \text{(equation 4)}$$

Thus, the difference in distance between one of the light sources and the envelope surface for different locations at the envelope surface (and consequently the difference in illuminance at different locations of the envelope surface by one of the light sources) may be compensated for by the angle α that the envelope surface has with the incoming light.

In general, the portion of the envelope 304 located closest to the base 301 has a radius (distance from the symmetry axis 306 to the envelope 304) which increases with increasing distance from the base 301. This defines a first portion 304a of the envelope 304. Accordingly, the portion of the envelope surface located at a shorter distance to a light source where there is higher illuminance is more tilted with respect to the light source such that the projected area becomes smaller and gets a lower illuminance. As a result, the sides 315 of the mixing cavity 305 according to the present disclosure converge in the direction of the closest light source 302, 303 so a very small distance needs to be compensated for by a surface almost parallel to the emission direction.

Thus, close to the source, the envelope is parallel to the emission direction and the radius of curvature in the cross-section of the envelope approaches infinity (almost flat), or, in other words, the curvature becomes zero in this cross-section plane perpendicular to the base. Further, in a rotationally symmetric system the envelope may have a finite radius of curvature in the opposite direction (in a cross-section parallel to the base).

In a second portion 304b, the curvature of the envelope 304 monotonically increases with increasing distance from the base 301 until the apex 307 of the envelope 304 at which the curvature is the highest. The shape of the envelope 304 is therefore defined along the symmetry axis 306 by a starting point at the base 301, the first portion 304a (with increasing radius) between the base 301 and the second portion 304b, the second portion 304b (with decreasing radius) between the first portion 304a and the apex 307 at which the curvature is the highest. For both portions, the curvature monotonically increases.

It will be appreciated that the light sources may be Lambertian light sources, or non-Lambertian light sources as long as all light sources in the lighting device have essentially the same intensity distribution. In one example, however, both light sources may be Lambertian light sources.

Figure 3C:
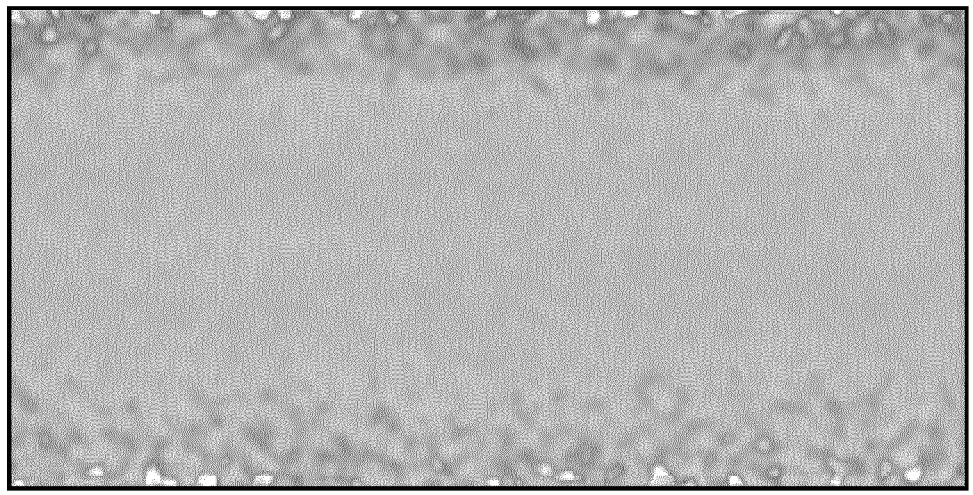
FIG. 3c shows a greyscale representation of a colour intensity plot of the far-field distribution provided by the lighting device shown in FIG. 3b.

FIG. 3c shows a plot of the far-field distribution provided by a lighting device 310 having a diffuser cavity as shown in FIG. 3b. As may be seen in this plot, no colour asymmetries are introduced in the far-field for the intensity distribution. The illuminance is constant as a function of a rotation angle around the symmetry axis 306.

Figure 3D:
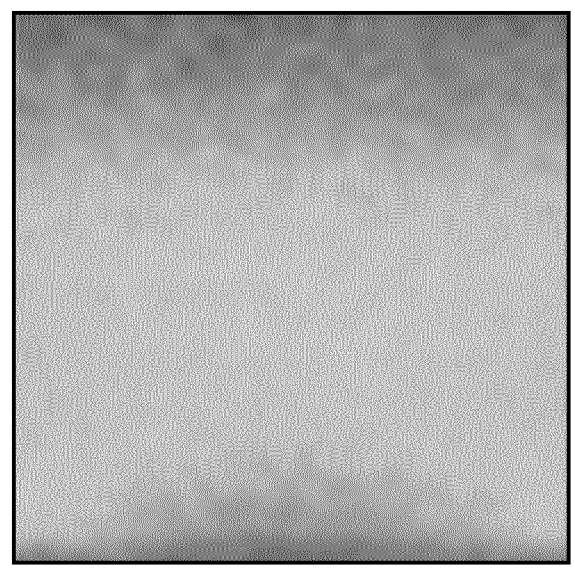
FIG. 3d shows a greyscale representation of a colour illuminance plot of the near-field distribution provided by the lighting device shown in FIG. 3b.

FIG. 3d shows a plot of the near-field distribution provided by a lighting device 310 having a diffuser cavity as shown in FIG. 3b. As may be seen in the plot, the near-field colours which show the illuminance are almost completely mixed except for some minor artefacts near the base 301.

Still, there may be some artefacts close to the source(s) that are caused by finite source size effects since the envelope shape is only calculated based on the position of the light sources. These finite source size effects may be difficult to correct for, since these artefacts are likely to occur anyway caused by limited accuracy of placement, shape accuracy, or details in the source emission pattern.

Figure 4A:
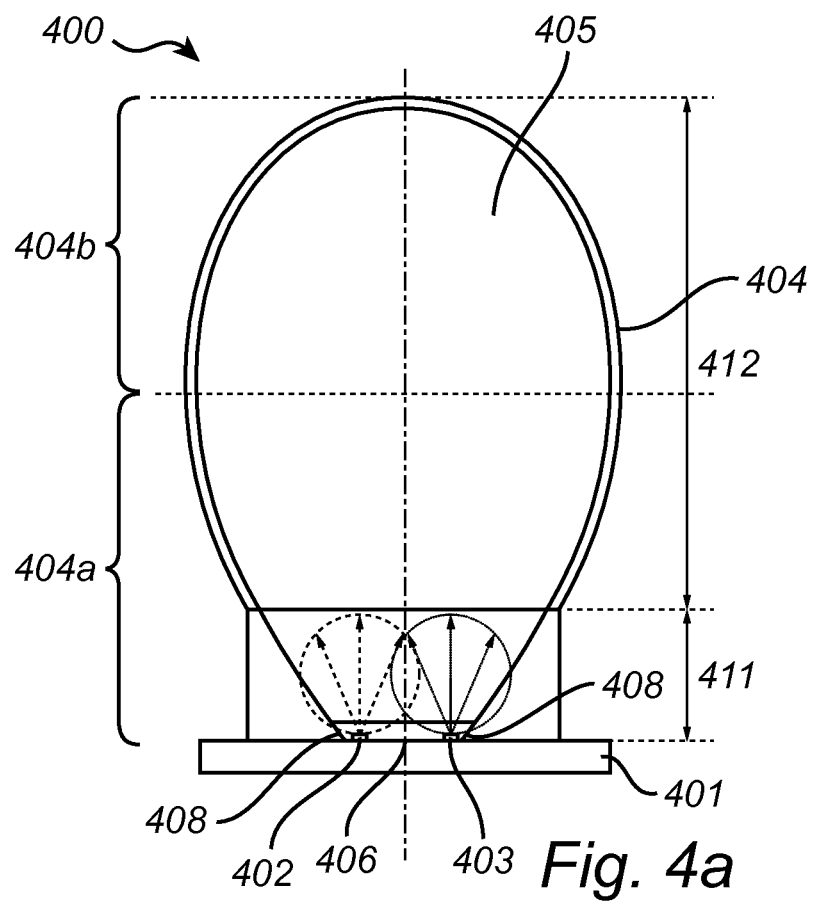
FIG. 4a shows a cross sectional view of a lighting device including a partly reflective cavity according to another embodiment.

With reference to FIG. 4a, a lighting device 400 according to another embodiment is described.

FIG. 4a shows a lighting device 400 which is equivalent to the lighting device 310 described with reference to FIG. 3b, with light sources 402, 403, a symmetry axis 406, an edge 408, an envelope 404 disposed on a base 401 for defining a cavity 405 as for the lighting device 310, with a first portion 404a and a second portion 404b except that at least a portion 411 of the first portion 404a of the transmitting envelope surface 412 which is closest to the base 401 may have a reflective envelope surface. For example, the envelope surface structure closest to the base 401 may be a white reflective cup 411 while the upper portion still may be a transmitting envelope surface 412.

Figure 4B:
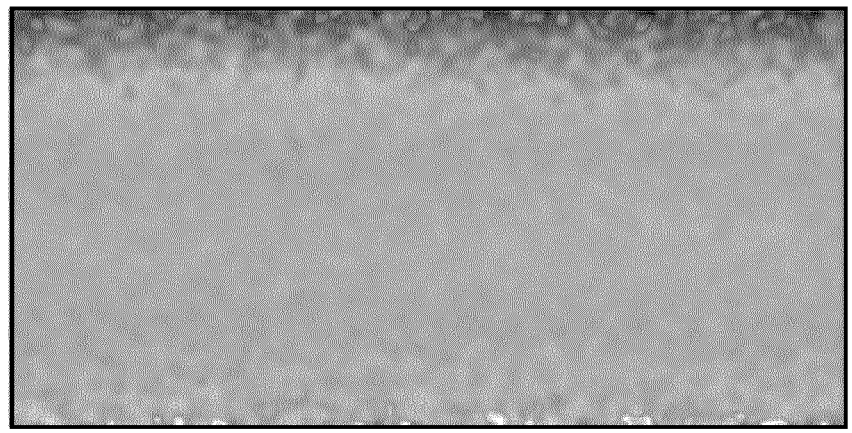

With reference to FIG. 4b, a plot of the far-field distribution provided by the lighting device 400 described with reference to FIG. 4a is shown.

Figure 4C:
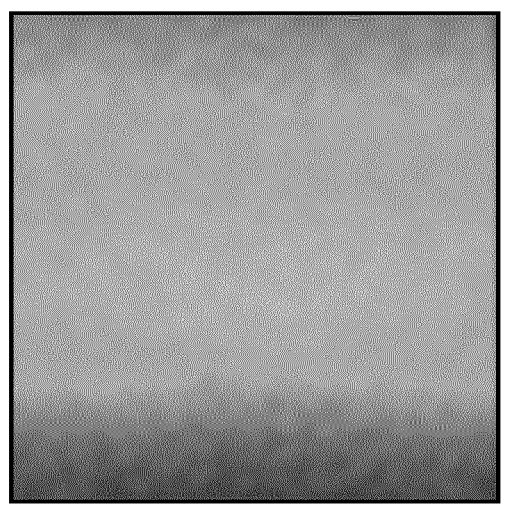

With reference to FIG. 4c, a plot of the near-field distribution provided by the lighting device 400 described with reference to FIG. 4a is shown.

As may be seen in these plots, the illuminance plot of the near-field distribution has improved. Thus, the artefacts close to the light sources 402, 403 have been reduced. For example, artefacts for finite source sizes of approximately 2×2 mm may be reduced. However, the far-field distribution may not be so much improved.

Figure 5A:
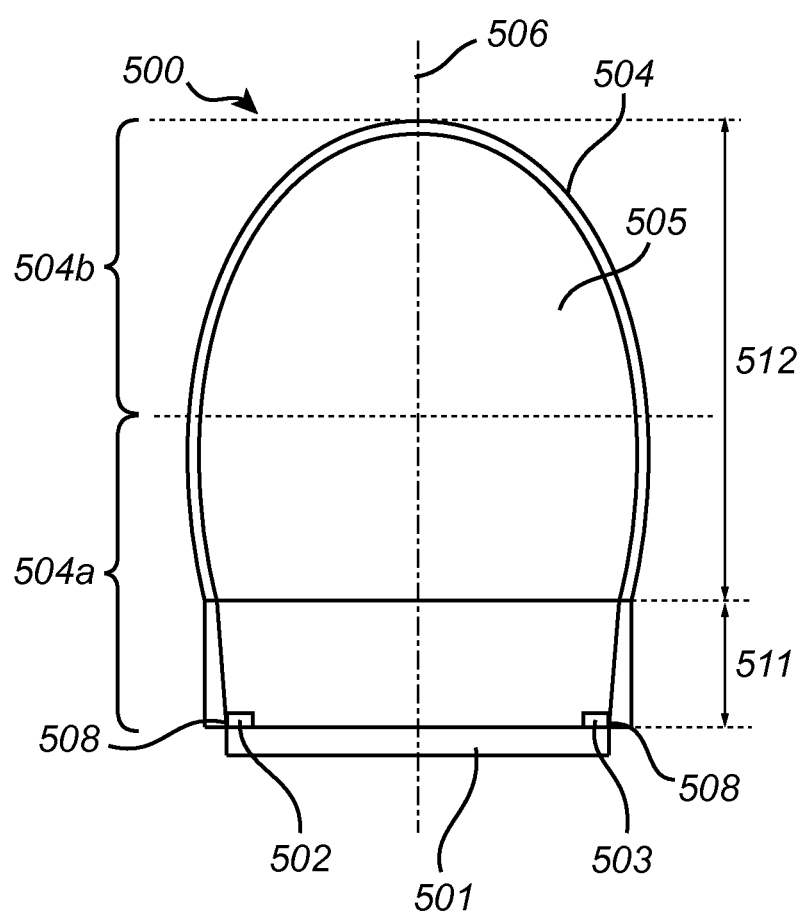
FIG. 5a shows a cross sectional view of the lighting device in which the light sources are positioned at the edge of an envelope of the lighting device.

With reference to FIG. 5a, a lighting device 500 according to a further embodiment is described.

FIG. 5a shows a lighting device 500 which is equivalent to the lighting device 310 described with reference to FIG. 4a, with light sources 502, 503, a symmetry axis 506, an edge 508, an envelope 504 disposed on a base 501 for defining a cavity 505 as for the lighting device 400, except that the spacing between the cavity edges is wider than in the lighting device 400 described with reference to FIG. 4a. The cavity edge 508 may in this embodiment define the intersection between the envelope 504 (or cavity) and the base 501. In this embodiment, at least one of the light sources 502, 503 is arranged at the edge 508 of the cavity 505. The surface of the envelope 504 of the lighting device 500 may be reflective in the portion 511 of the envelope surface that is closest to the base 501. The upper portion (i.e. a portion of the first portion 504a having an increasing radius along the symmetry axis 506 and the second portion 504b having a decreasing radius along the symmetry axis 506. For both portions, a curvature is monotonically increasing with increasing distance from the base 501 until the curvature is at the highest at the apex of the envelope) may be a transmitting envelope surface 512, as also shown in the lighting device 400. The cavity 505 may be designed based on that the light sources 502, 503 are positioned on the inner cavity edge 508 of the lighting device 500.

The spacing between the two light sources 502 and 503 may define the entrance/opening of the cavity 505 (or the envelope 504) so that the spacing between the light sources define a larger diameter (or size) of the cavity. For example, the spacing between the light sources may be about 20 mm.

Figure 5B:
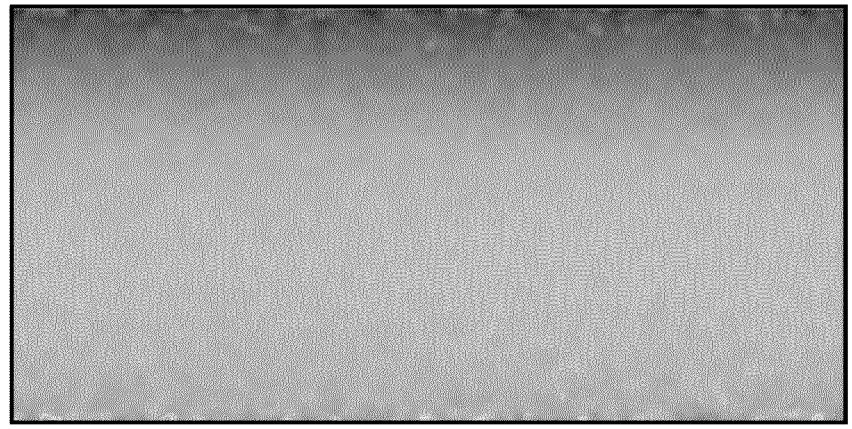

With reference to FIG. 5b, a plot of the far-field distribution provided by the lighting device 500 described with reference to FIG. 5a is shown.

Figure 5C:
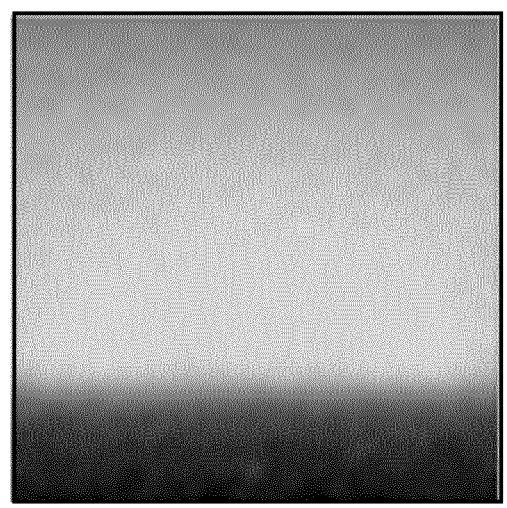

With reference to FIG. 5c, a plot of the near-field distribution provided by the lighting device 500 described with reference to FIG. 5a is shown.

Thus, by having the light sources 502, 503 placed at the cavity edge 508 the near-field colour artefacts have been further reduced.

The present disclosure may be applied to one, two or even more light sources disposed on the base at any distance to the symmetry axis, as long as all sources have the same distance to the symmetry axis, like for example in a ring around the symmetry axis. Further, the present disclosure may be applied to light sources with more than two different spectra at any position around the symmetry axis as long as they also are positioned at the same distance to the symmetry axis.

Figure 6A:
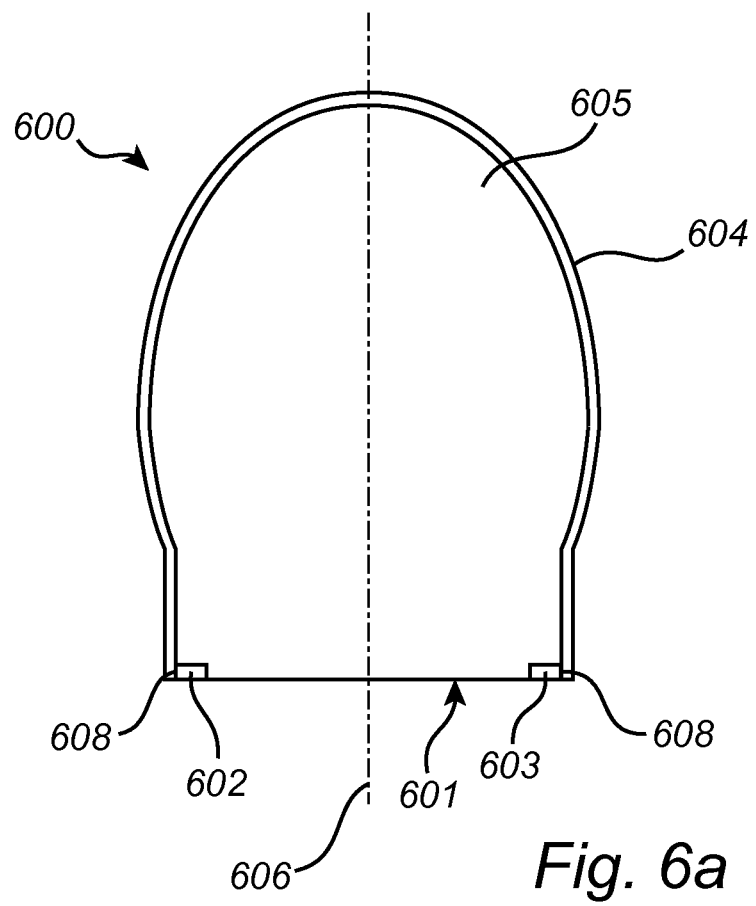
FIG. 6a shows a cross sectional view of the lighting device with a fully reflective and wide cavity according to an embodiment.

With reference to FIG. 6a, a lighting device 600 according to another embodiment is described.

FIG. 6a shows a lighting device 600, which is equivalent to the lighting device 500 described with reference to FIG. 5a, except that in this embodiment the whole envelope surface is reflective. As for the lighting device 500, the lighting device 600 comprises two light sources 602, 603, a symmetry axis 606, an envelope 604 disposed on a base 601 for defining a wide cavity 605 and a cavity edge 608. With a reflective envelope surface, the light is both injected into the mixing cavity 605 at the base 601 and output from base 601 i.e. through the same entrance/exit of the cavity 605. The base 601 may for example be made of transparent material to be able to transmit light.

Figure 6B:
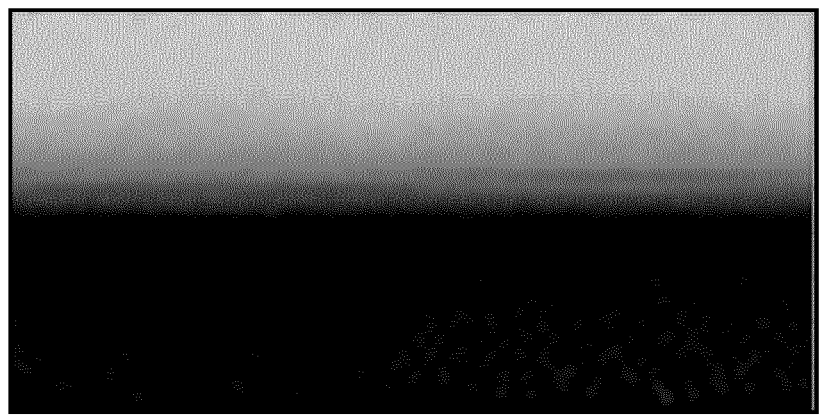

With reference to FIG. 6b, a plot of the far-field distribution provided by the lighting device 600 described with reference to FIG. 6a is shown. In this plot, there are colour artifacts close to the far-field cut-off angle. The output from the base 601 creates a cut-off in the angular intensity distribution at the base plane. Close to this cut-off, i.e. for light directions close to the horizontal plane, the light originates from the reflective envelope part close to the base plane. Since this part is closest to the light source, the colour errors caused by finite source size are most prominent close to the base plane. These errors in the colour artifacts which are shown as the coloured horizontal lines in the colour plot of FIG. 6b.

These artifacts may be reduced by making the reflective envelope surface close to the base 601 specular reflective instead of purely diffuse white reflective.

For this purpose, a lighting device 700 according to another embodiment is described with reference to FIG. 7.

Figure 7:
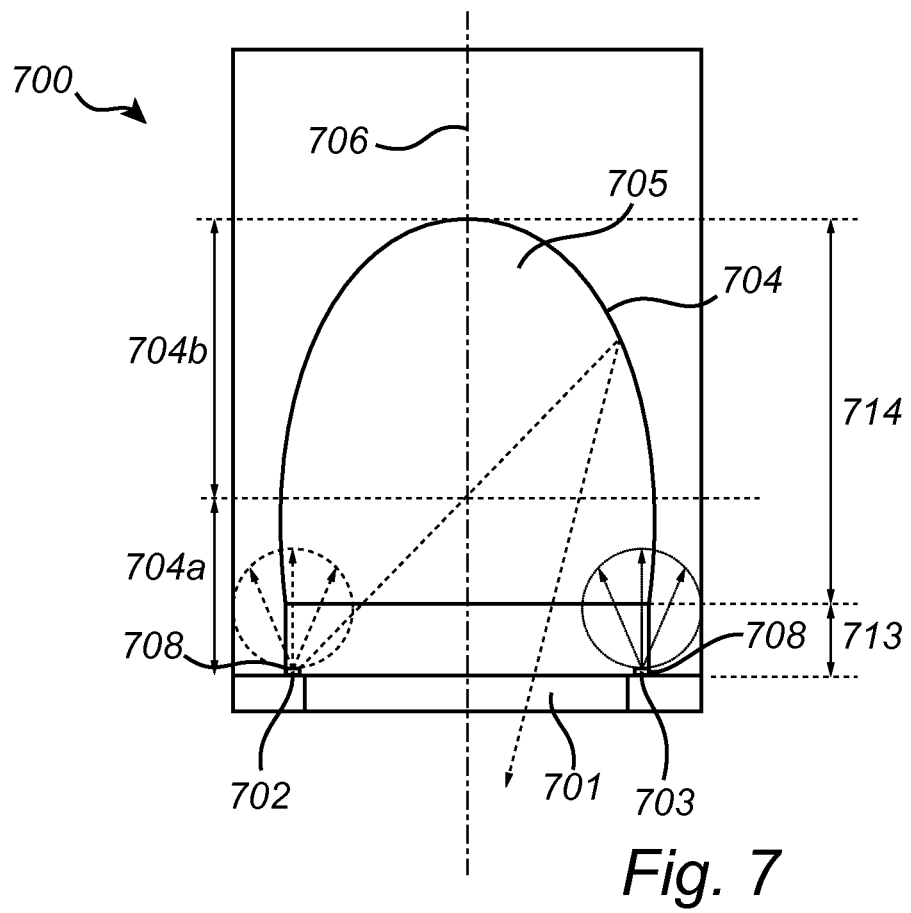
FIG. 7 shows a cross sectional view of the lighting device including a specular reflective cavity part according to an embodiment.

FIG. 7 shows a lighting device 700 with specular reflectors. The lighting device 700 is equivalent to the lighting device 600 described with reference to FIG. 6a, except that the envelope surface is a specular reflective surface close to the base instead of being a white reflective surface. As for the lighting device 600, the lighting device 700 comprises two light sources 702, 703, a symmetry axis 706, an envelope 704 disposed on a base 701 for defining a cavity 705 and a cavity edge 708. An upper portion 714 of the cavity 705 relative to the base 701 is made diffusive white reflective while a lower portion 713 close to the base 701 (the lower portion as shown in FIG. 7) is specular reflective. In the example shown in FIG. 7, a portion of the first portion 704a having a radius increasing with increased distance from the base 701 and being located closest to the base 701 is specular reflective while the remaining part of the envelope (i.e. the remaining part of the first portion 704a and the second portion 704b) is diffusive white reflective. Specular reflective may herein be (or may mean) a mirror-like reflection of the light from a smooth surface, such that the light from one single direction is reflected with the same angle with respect to the surface in the other direction out of the surface. A diffuse white reflection may herein be (or may mean) light reflection on a rough surface such that the incoming light gets reflected at different angles with respect to the surface.

In a further embodiment, the cavity may be partly transmitting and partly specular reflecting. The cavity may have an envelope surface that comprises bulk scattering particles. These particles may have a specular component in the reflection (part of the component may be specular reflected at the surface and part may be diffusively reflected by the bulk scattering particles). Hence, the envelope of the cavity may be partly diffuse transmitting, partly diffuse and partly specular reflecting.

Specific embodiments of the invention have now been described. However, several alternatives are possible, as would be apparent for someone skilled in the art.

The person skilled in the art realizes that the present invention by no means is limited to the preferred embodiments described above. On the contrary, many modifications and variations are possible within the scope of the appended claims. Additionally, variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measures cannot be used to advantage. Any reference signs in the claims should not be construed as limiting the scope.

The invention claimed is:

1. A lighting device comprising:
   at least one light source disposed on a base extending within a plane; and
   an envelope having a surface, disposed at least above said base and defining a cavity extending along a symmetry axis;
   wherein:
   said plane is arranged to intersect the symmetry axis;
   said at least one light source is arranged for injecting light into the cavity at a distance X from the symmetry axis, along a radial direction relative to the symmetry axis, said distance X being at least 50% of a total distance between the symmetry axis and an edge of the envelope, or a projection of said edge of said envelope on said plane in which the base extends, as seen along said radial direction;
   a curvature of the envelope is monotonically increasing with an increasing distance from the base; and
   wherein a tangent at the surface of the envelope has a slope defined such that illuminance of said at least one light source is constant or approximately constant along a circle on the surface, in a plane perpendicular to the symmetry axis.

2. The lighting device according to claim 1, wherein the distance X is at least 80% of the total distance between the symmetry axis and the edge of the envelope, or a projection of said edge of said envelope on said plane in which the base extends, as seen along said radial direction.

3. The lighting device according to claim 1, wherein a portion of the envelope, close to the base, has a radius relative to the symmetry axis that increases with an increasing distance from the base.

4. The lighting device according to claim 1, wherein the surface of the envelope has diffusive properties.

5. The lighting device according to claim 1, wherein the surface of the envelope comprises a light scattering texture and/or wherein a material of the envelope comprises scattering particles.

6. The lighting device according to claim 1, wherein the envelope is rotationally symmetric with respect to the symmetry axis.

7. The lighting device according to claim 1, wherein said at least one light source includes at least two light sources, wherein each light source is arranged on the base at an equal distance to the symmetry axis.

8. The lighting device according to claim 1, wherein said at least one light source includes at least two light sources configured to generate light according to different color spectra.

9. The lighting device according to claim 7, wherein said at least two light sources have similar intensity distributions.

10. The lighting device according to claim 1, wherein the surface of the envelope comprises a transmitting surface.

11. The lighting device according to claim 1, wherein the envelope further comprises a reflective surface portion.

12. The lighting device according to claim 1, wherein the at least one light source is a light-emitting diode, LED, or a Lambertian light source.

13. The lighting device according to claim 1, wherein the base is configured to output light from said cavity.

14. The lighting device according to claim 1, wherein the cavity is arranged to mix light emitted from said at least one light source.

* * * * *